(12) United States Patent
Nishizaki et al.

(10) Patent No.: US 6,883,637 B2
(45) Date of Patent: Apr. 26, 2005

(54) ELECTRIC POWER STEERING DEVICE AND CONTROL METHOD UTILIZED FOR CONTROLLING SAID ELECTRIC POWER STEERING DEVICE

(75) Inventors: Katsutoshi Nishizaki, Mie (JP); Toshiaki Oya, Osaka (JP); Masahiko Sakamaki, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/740,808

(22) Filed: Dec. 22, 2003

(65) Prior Publication Data

US 2004/0140148 A1 Jul. 22, 2004

(30) Foreign Application Priority Data

Dec. 24, 2002 (JP) ..................................... P.2002-372289

(51) Int. Cl.[7] .................................................. B62D 5/04
(52) U.S. Cl. ......................................... 180/446; 701/43
(58) Field of Search ................................. 180/443, 444, 180/446; 701/41, 43

(56) References Cited

U.S. PATENT DOCUMENTS

| | | | | |
|---|---|---|---|---|
| 5,507,359 A | * | 4/1996 | Wada | 180/446 |
| 5,698,956 A | * | 12/1997 | Nishino et al. | 318/432 |
| 5,699,249 A | * | 12/1997 | Noro et al. | 701/42 |
| 6,032,756 A | * | 3/2000 | Nishimura et al. | 180/446 |
| 6,131,693 A | * | 10/2000 | Mukai et al. | 180/446 |
| 6,240,349 B1 | * | 5/2001 | Nishimoto et al. | 701/41 |
| 6,390,229 B1 | * | 5/2002 | Kaji | 180/443 |
| 6,407,524 B1 | | 6/2002 | Endo et al. | |
| 2002/0060538 A1 | | 5/2002 | Hara et al. | |
| 2003/0069675 A1 | * | 4/2003 | Kifuku et al. | 701/41 |

FOREIGN PATENT DOCUMENTS

EP    1 213 632 A1    6/2002
JP    2002-249063     9/2002

* cited by examiner

*Primary Examiner*—Avraham Lerner
(74) *Attorney, Agent, or Firm*—McGinn & Gibb, PLLC

(57) ABSTRACT

An electric power steering device capable of attaining the expected control and control characteristics while using a phase compensator, includes a target current setting unit including a compensation unit having an inertia compensating unit for outputting an inertial compensating current value and a damper control unit for outputting a damper control current value, a compensation unit for outputting a compensation current value, a basic assist current setting unit for outputting a basic assist current value, and a phase compensating unit connected with the downstream stage of the basic assist current setting unit for outputting a target current value by performing a phase compensation of an added current value while receiving no influence from the dead zone or the characteristic break points of an assist table for setting the basic assist current value.

20 Claims, 5 Drawing Sheets

ELECTRIC POWER STEERING DEVICE AND CONTROL METHOD UTILIZED FOR CONTROLLING SAID ELECTRIC POWER STEERING DEVICE

BACKGROUND OF THE INVENTION

1. Field of the Invention

The present invention relates to an electric power steering device for applying a steerage assisting power to the steering mechanism of a vehicle by an electric motor. Moreover, the present invention relates to a control method utilized for controlling said power steering device.

2. Description of the Related Art

In the related art, there has been used the electric power steering device for applying the steerage assisting power to the steering mechanism by driving the electric motor in accordance with the steering torque applied by the driver to the handle (or the steering wheel). This electric power steering device is provided with a torque sensor for detecting the steering torque to be applied to the handle or operation means for the steerage, to output a torque detection signal indicating the steering torque, so that the target value of an electric current to be fed to the electric motor is set on the basis of the torque detection signal coming from the torque sensor. And, a command value to be fed to the drive means of the electric motor is generated by a proportional integration controller on the basis of a deviation between the target value and a current to flow actually through the electric motor. The drive means of the electric motor includes: a PWM signal generating circuit for generating a pulse width modulation signal (or a PWM signal) at a duty ratio according to that command value; and a motor drive circuit constructed of power transistors to be turned ON/OFF according to the duty ratio of the PWM signal. The drive means applies a voltage according to the duty ratio, i.e., a voltage according to the command value, to the electric motor. The current to be fed to the electric motor by that voltage application is detected by a current detecting circuit, so that the difference between the aforementioned target value and the detected value is used as a deviation for generating the aforementioned command value. Thus in the electric power steering device, the feedback control is so made that the current at the target value set on the basis of the steering torque indicated by the torque detection signal from the torque sensor may flow through the electric motor.

The values of the proportional gain and the integration gain (as will be called the "PI gain") of the proportional integration controller are desired to be higher for enhancing the responsibility of the entire system. If the value of the PI gain is excessively high, however, the system is liable to instabilities in the vicinity of the natural oscillation frequency of the mechanical line, e.g., in the vicinity of 10 to 25 Hz. In the related art, therefore, there is provided a phase compensator for stabilizing the system not by setting the value of the PI gain excessively high but by sacrificing the responsibility of the entire system and for improving the phase characteristics in a practical frequency band. Specifically, the torque detection signal from the torque sensor is given to a phase compensator so that its phase is advanced by the phase compensator thereby to improve the responsibility of the entire system in the practical frequency band. A new low-pass filter is added to the frequency band, in which the gain characteristics are enhanced according to that construction.

As described above, the target value of the current to be fed to the electric motor is determined according to the steering torque compensated by the phase compensator. More specifically, an inertia compensating current value for suppressing the influences of the moment of inertia of the electric motor, a damping control current value for improving the convergence of the steering wheel, a return control current value for improving the operability at the returning time of the steering wheel, and so on are added to the current value determined according to the steering torque compensated by the phase compensator, thereby to determine the target value of the current to be fed to the electric motor. Generally, the inertia compensating current value is determined according to the differential value of the steering torque. Such construction is disclosed in JP-A-2002-249063, for example.

In the electric power steering device thus far described, however, the inertia compensating current value is determined on the basis of the differential value of the steering torque, as compensated by the phase compensator so that it is not always identical to the result determined on the actual steering torque. Therefore, it may occur that the control result expected cannot be obtained. A similar problem also arises in case the various compensation control such as the aforementioned damping control or the various judgments are done on the basis of the steering torque compensated by the phase compensator.

In the aforementioned electric power steering device, moreover, the target value of the current to be fed to the electric motor is frequently determined on the basis of a prepared assist table (i.e. assist map). However, this assist table contains a dead zone and characteristic break points. In the neighborhood control regions, therefore, the expected characteristics, as designed, may not be attained. In case this assist table is altered, moreover, it is necessary to redesign the parameters of the phase compensator corresponding to the assist table altered.

SUMMARY OF THE INVENTION

In view of the aforementioned problems of the related arts, the invention aims to provide an electric power steering device, which can attain the expected control and control characteristics (as designed) while using phase compensator.

Moreover, the present invention aims to provide a control method for controlling a power steering device so as to attain the expected control and control characteristics (as designed) while using phase compensator.

According to a first aspect of the invention, there is provided an electric power steering device for applying a steerage assisting power to the steering mechanism of a vehicle by driving an electric motor in accordance with a steering torque given by operation means for steering the vehicle, said power steering device comprising:

a torque sensor for detecting the steering torque;

target value setting means for setting as a target value the value of an electric current to be fed to the electric motor; and control means for feedback-controlling the electric motor on the basis of a current deviation between the current target value and the current to flow through the electric motor;

wherein the target value setting means includes basic assist current setting means for accepting the steering torque from the torque sensor, to set a basic assist current value for determining a current to be fed to the electric motor, on the basis of the steering torque accepted; and phase compensating means for performing the phase compensation of the basic assist current value, to output the value of the current to be fed to the electric motor.

According to the first aspect of the invention, the phase compensating means is disposed at the downstream stage of the basis assist current setting means. Therefore, the dead band and the characteristic break points of the basic assist current setting means (or the assist table contained in the setting means) exert no influence upon the design for setting the parameters of the phase compensating means. Likewise, the alteration in the assist table exerts no influence upon the design for setting the parameters of the phase compensating means. Therefore, it is possible to provide the electric power steering device, which can attain the expected control and control characteristics (as designed) while using the phase compensator.

According to a second aspect of the invention, the target value setting means includes compensation means for outputting a compensation current value to correct the basic assist current value; and addition means for outputting an added current value obtained by adding the basic assist current value and the compensation current value, and the phase compensating means performs the phase compensation of the added current value.

According to this second aspect, the steering torque from the torque sensor is applied not through the phase compensating means but directly to the basic assist current setting means and the compensation means. Therefore, it is possible to attain the expected control results (as designed).

According to a third aspect of the invention, the compensation means includes inertia compensating means for accepting the steering torque from the torque sensor, to set a current compensating inertia value for the inertia compensation of the electric motor, on the basis the differential value of the steering torque accepted, and the compensation current value includes the inertia compensating current value.

According to this third aspect, the inertia compensating means sets the inertia compensating current value on the basis of the differential value of the steering torque, as fed from the torque sensor not through the phase compensating means but directly. Therefore, it is possible to attain the expected control results (as designed).

Figure 1:
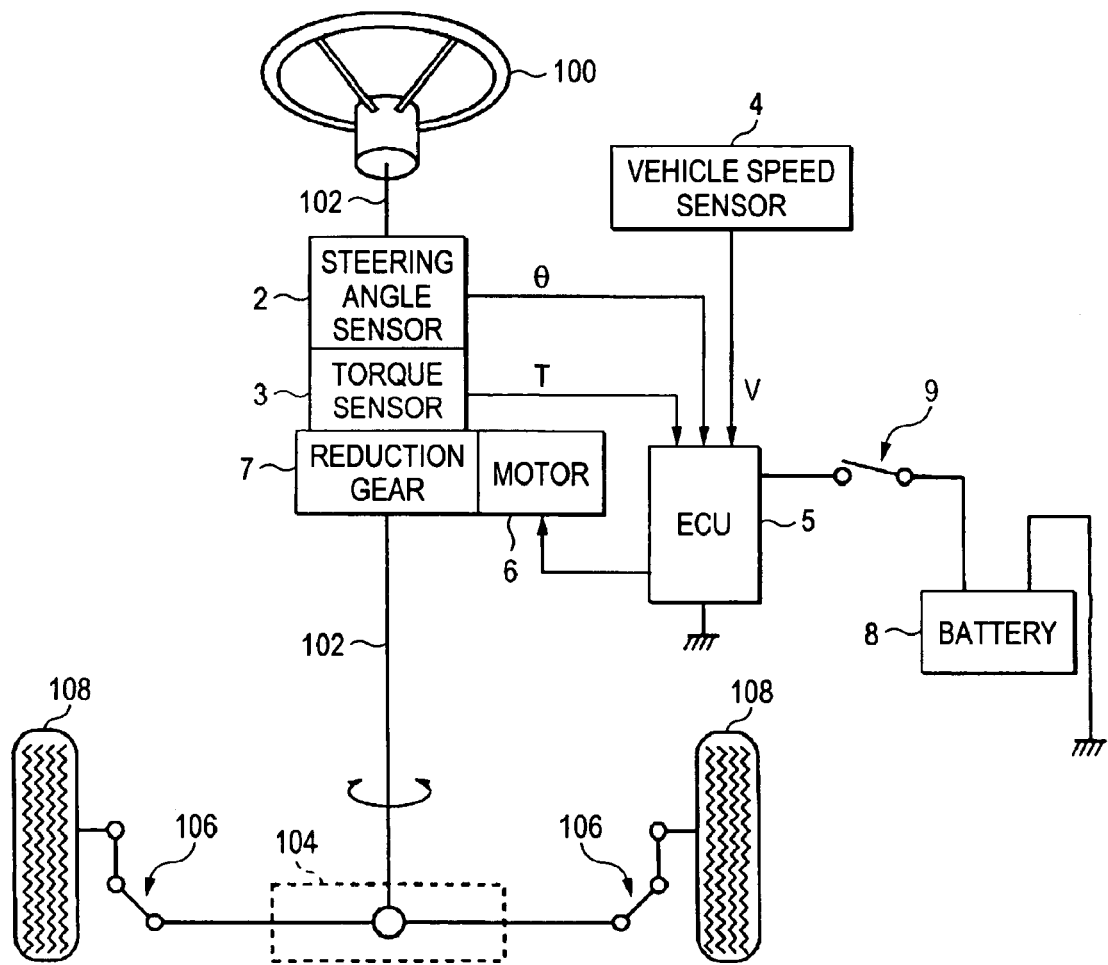
FIG. 1 is a schematic diagram showing the construction of an electric power steering device according to one embodiment of the invention, together with a vehicular construction related thereto.

In the drawings, a reference numeral 2 refers to a steering angle sensor; 3 to a torque sensor; 4 to a vehicle speed sensor; 5 to an electronic control unit (ECU); 6 to a MOTOR; 10 to a microcomputer (motor control unit); 12 to a target current setting unit (target value setting means); 14 to a subtracter; 16 to a feedback control operation unit (FB control operation unit); 18 to a PWM signal generating unit; 19 to a current detector; 20 to a motor drive circuit; 121 to a compensation unit; 122 to a basic assist current setting unit; 123, 223 to a phase compensating unit; 124, 125, 1214 to an adder; 1211a, 1211b to a differentiator; 1212 to an inertia compensating unit; and 1213 to a damper control unit.

In the drawings, a reference sign "It" refers to a current target value; "It'" to an added current value; "Is" to a current detected value; "Ia" to a basic assist current value; "Ii" to an inertia compensating current value; "Id" to a damping control current value "Ic" to a compensation current value; "V" to a vehicle speed; "T" to a steering torque; "θ" to a steering angle; and "ω" to a steering angular velocity.

DETAILED DESCRIPTION OF THE PREFERRED EMBODIMENTS

One embodiment of the invention will be described with reference to the accompanying drawings.

<1. Entire Construction>

FIG. 1 is a schematic diagram showing the construction of an electric power steering device according to one embodiment of the invention, together with a vehicular construction related thereto. This electric power steering device is provided with: a steering shaft 102 fixed at its one end to a handle (or a steering wheel) 100 acting as steering operation means; a rack-and-pinion mechanism 104 connected to the other end of the steering shaft 102; a steering angle sensor 2 for detecting a steering angle or a turning angle of the handle 100; a torque sensor 3 for detecting a steering torque to be applied to the steering shaft 102 by the operation of the handle 100; a vehicle speed sensor 4 for detecting the speed of the vehicle mounted with the electric power steering device; an electric motor 6 for generating a steerage assisting power to lighten the load on the driver by the handling operation (or the steering operation); a reduction gear 7 for transmitting the steerage assisting power generated by the motor 6 to the steering shaft 102; and an electronic control unit (ECU) 5 for controlling the drive of the motor 6 on the basis of sensor signals from the steering angle sensor 2, the torque sensor 3 and the vehicle speed sensor 4, by receiving the feed of a power source from a car-mounted battery 8 through an ignition switch 9.

Here in the steering shaft 102, a torsion bar is interposed between a portion on the side of the handle 100 and a portion, to which the steerage assisting torque is applied through the reduction gear 7. The torque sensor 3 detects the steering torque by detecting the torsion of the torsion bar. A detected value T of the steering torque thus detected is outputted as a steering torque detection signal from the torque sensor 3 and is inputted to the ECU 5. Moreover, the steering angle sensor 2 outputs a signal indicating a detected value θ of the steering angle of the turning angle of the handle 100, as a steering angle. Still moreover, the vehicle speed sensor 4 outputs a signal indicating a detected value V or the running speed of the vehicle, as a vehicle speed signal. These steering angle signal and vehicle speed signal are also inputted to the ECU 5.

When the driver operates the handle 100 of the vehicle mounted with the electric power steering device, the steering torque according to the operation is detected by the torque sensor 3 so that the motor 6 is driven by the ECU 5 on the basis of the detected value T of the steering torque and the detected value V of the vehicle speed detected by the vehicle speed sensor 4. As a result, the motor 6 generates the steerage assisting power, and this steerage assisting power is applied through the reduction gear 7 to the steering shaft 102, so that the load on the driver by the steering operation is lightened. Specifically, the sum of the steering torque applied by the handling operation and the torque by the steerage assisting power generated by the motor 6 is applied as an output torque to the rack-and-pinion mechanism 104 through the steering shaft 102. When the pinion shaft is accordingly turned, this turn is converted into the reciprocating motions of the rack shaft by the rack-and-pinion mechanism 104. The rack shaft is connected at its two ends to wheels 108 through steering linkages 106 each composed of a tie rod and a knuckle arm, so that the wheels 108 are steered according to the reciprocating motions of the rack shaft.

<2. Construction and Actions of Control Device>

Figure 2:
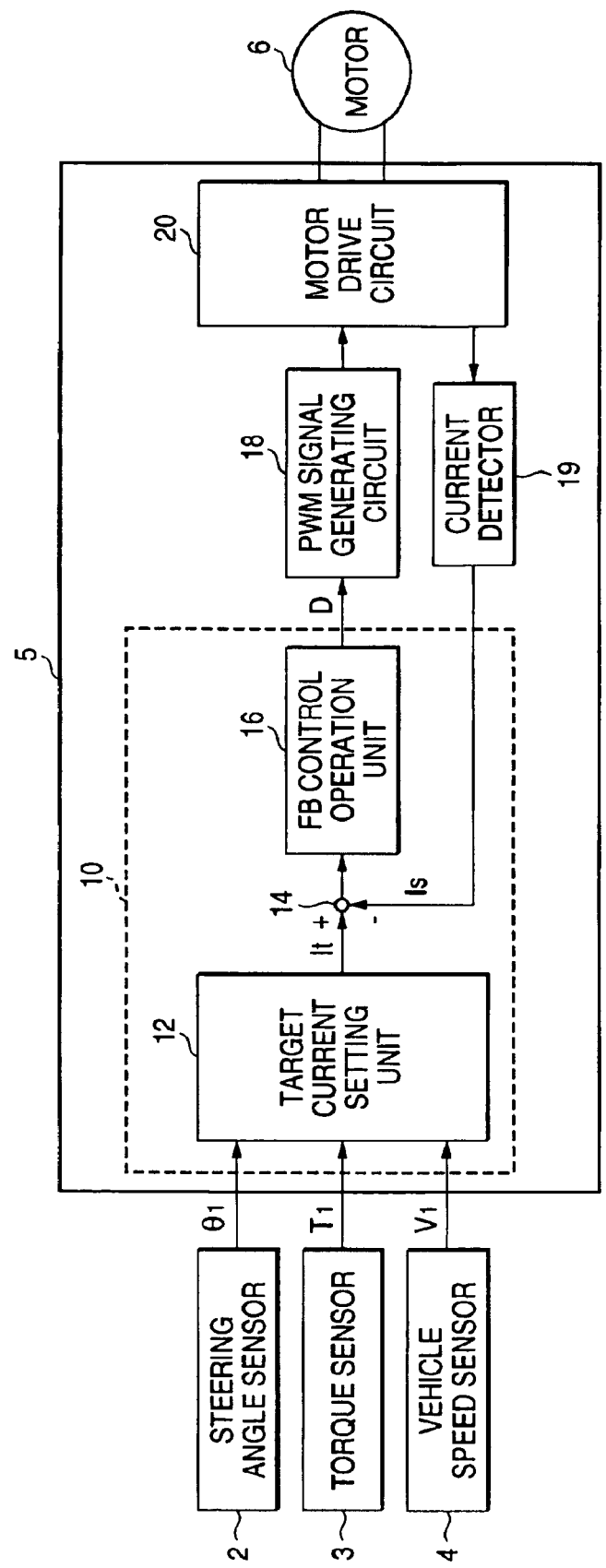
FIG. 2 is a block diagram showing a functional construction of an ECU or a control device in the electric power steering device according to the embodiment.

FIG. 2 is a block diagram showing a functional construction of the ECU 5 or the control device in the electric power steering device thus far described. This ECU 5 is constructed to include: a microcomputer 10 for functioning as a motor control unit; a PWM signal generating circuit 18 for generating a pulse width modulation signal (i.e. a PWM signal) at a duty ratio according to a command value D outputted from the microcomputer 10; a motor drive circuit 20 for applying to the motor 6 a voltage according to the duty ratio of the PWM signal; and an electric current detector 19 for detecting an electric current to flow in the motor 6.

The microcomputer 10 executes a predetermined program stored in its inside memory so that it functions as a motor control unit. This motor control unit is composed of a target current setting unit 12, a subtracter 14 and a feedback control operation unit (as will be abbreviated into the "FB control operation unit") 16. In this motor control unit, the target current setting unit 12 determines the target value of a current to be fed to the motor 6, on the basis of the detected value θ of the steering angle outputted from the steering angle sensor 2 (as will be called merely as the "steering angle θ"), the detected value T of the steering torque outputted from the torque sensor 3 (as will be called merely as the "steering torque. T") and the detected value V outputted from the vehicle speed sensor 4 (as will be called merely as the "vehicle speed V"). The detailed construction and actions of the target current setting unit 12 will be described hereinafter. The subtracter 14 calculates the deviation (It–Is) between a current target value It outputted from the target current setting unit 12 and a detected value Is of the motor current outputted from the current detector 19. By the proportional integration control operation based on the deviation (It–Is), the FB control operation unit 16 generates the aforementioned command value D to be fed to the PWM signal generating circuit 18 for the feedback control.

The PWM signal generating circuit 18 generates a pulse signal at the duty ratio according to that command value D, that is, the PWM signal having a pulse width varying according to the command value D. The motor drive circuit 20 is typically exemplified by a bridge circuit having four power field effect type transistors connected between the power line of the battery 8 and the ground line. This bridge circuit applies to the motor 6 a voltage according to the pulse width (or the duty ratio) of the PWM signal. The motor 6 generates a torque having a magnitude and direction according to the current fed by the voltage application. Thus, the subtracter 14 for receiving the current target value It, the FB control operation unit 16, the PWM signal generating circuit 18, the motor drive circuit 20 and the current detector 19 for outputting the detected value Is of the motor current to the subtracter 14 construct control means for making a feedback control of the motor 6.

<3. Detailed Construction and Actions of Target Current Setting Unit>

Figure 3:
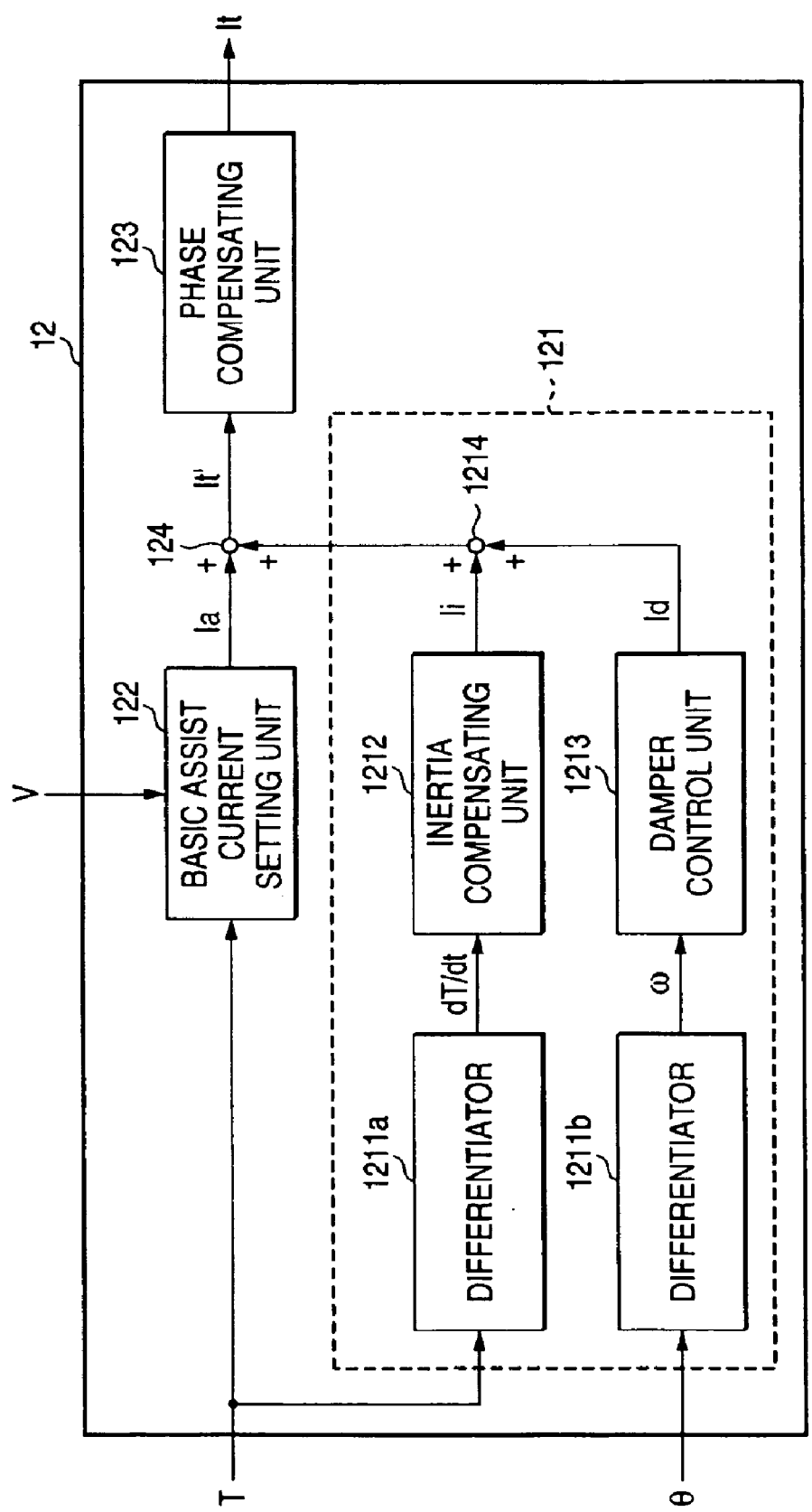
FIG. 3 is a block diagram showing a construction of a target current setting unit in the embodiment.

FIG. 3 is a block diagram showing a construction of the target current setting unit 12 in the aforementioned embodiment. This target current setting unit 12 includes: a compensation unit 121 for outputting a compensation current value Ic calculated for various compensations; a basic assist current setting unit 122 for outputting a basic assist current value Ia for the basis to determine the aforementioned current target value It by receiving the steering torque T; an adder 124 for outputting an added current value It' obtained by adding the compensation current value Ic and the basic assist current value Ia; and a phase compensating unit 123 for outputting the target current value It by receiving the added current value It' to perform a predetermined phase compensation. Moreover, the compensation unit 121 includes: a differentiator 1211a for outputting a differential value dT/dt of the steering torque T by receiving the steering torque T; an inertia compensating unit 1212 for outputting an inertia compensating current value Ii to suppress the influences of the inertia moment of the motor 6 by receiving the differential value dT/dt; a differentiator 1211b for outputting a steering angular velocity ω or a differential value of the steering angle θ by receiving the steering angle θ; a damper control unit 1213 for outputting a damping control current value Id to improving the convergence of the steering wheel 100 by receiving the steering angular velocity ω; and an adder 1214 for outputting the aforementioned compensation current value Ic by adding the inertia compensating current value Ii and the damping control current value Id. The actions of the components thus far described will be described in detail in the following.

Figure 4:
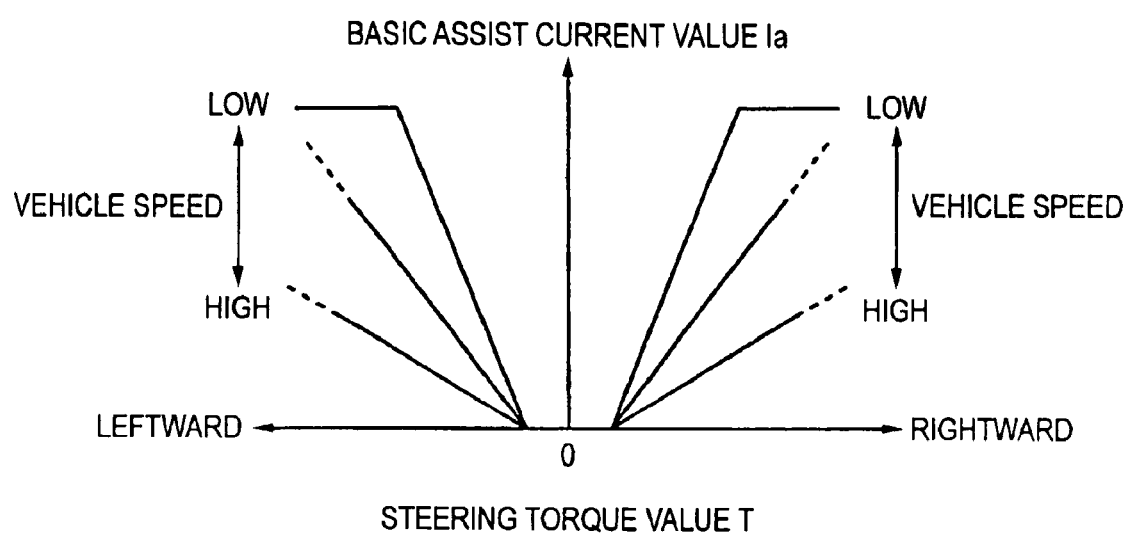
FIG. 4 is a diagram showing one example of an assist table to be prestored in a basic assist current setting unit in the embodiment.

The basic assist current setting unit 122 calculates the basic assist current value Ia on the basis of the steering torque T and the vehicle speed V. Specifically, the basic assist current setting unit 122 is prestored with a table (as called the "assist table") indicating such a relation between the basic assist current value Ia and the steering torque T by using the vehicle speed V as a parameter as provides a basis for generating a proper steerage assisting power. With reference to this assist table, the basic assist current setting unit 122 sets the basic assist current value Ia. FIG. 4 is a diagram showing one example of the assist table. As shown in FIG. 4, the assist table is set such that the basic assist current value Ia is made the lager for the lower vehicle speed V and the higher steering torque T. With this setting, the steerage assisting power becomes the higher for the heavier hand so that the steering operation is facilitated. In case the steering torque T is within a predetermined range near 0, moreover, the assist table has a dead zone, in which the basic assist current value Ia is 0. In case the steering torque T has an absolute value exceeding a predetermined magnitude for a low vehicle speed V, the assist table has characteristic break points, at which the basic assist current value Ia becomes constant.

The inertia compensating unit 1212 calculates the inertia compensating current value Ii on the basis of the differential value (dT/dt) of the steering torque T, as outputted from the differentiator 1211a. Specifically, the inertia compensating unit 1212 is prestored with either a table indicating a relation between the inertia compensating current value Ii for the proper inertia compensation and the differential value (dT/dt) of the steering torque T or a predetermined gain Kj for calculating the inertia compensating current value Ii. The inertia compensating unit 1212 sets the inertia compensating current value Ii on the basis of that table or the gain Kj. On the other hand, the damper control unit 1213 outputs the damping control current value Id on the basis of the steering angular velocity ω outputted from the differentiator 1211b.

Like the inertia compensating unit 1212, the damper control unit 1213 is prestored with either a table indicating the relation between the damping control current value Id for a proper damper control and the steering angular velocity ω or a predetermined gain Kc for calculating the damping control current value Id. The damper control unit 1213 sets the damping control current value Id on the basis of that table or the gain Kc. Here, these tables may indicate the aforementioned relations like the aforementioned assist table by using the vehicle speed V as a parameter.

The phase compensating unit 123 performs the phase compensation for the added current value It', which is obtained by adding the basic assist current value Ia and the compensation current value Ic by the adder 124, thereby to output the target current value It. In order to compensate the delay in the transmission characteristics of the control line thereby to stabilize the control line, specifically, the phase compensating unit 123 performs the phase compensation by passing the aforementioned added current value It' through a phase advance/delay filter having a predetermined parameter, and the phase-compensated target current value It. A transmission function G(s) of the phase compensating unit 123 is expressed by the following Formula (1), if a variable based on the Laplace transformation and corresponding to a differential operator is designated by s, if an attenuation coefficient after compensated by $\zeta_1$, if the attenuation coefficient of the compensated line by $\zeta_2$, if the natural angular frequency after compensated by $\omega_1$ and if the natural angular frequency of the compensated line by $\omega_2$:

$$G(s)=(s^2+2\zeta_2\omega_2 s+\omega_2^2)/(s^2+2\zeta_1\omega_1 s+\omega_1^2) \quad (1).$$

For $\omega_1=\omega_2=\omega_n$, moreover, Formula (1) is expressed by the following Formula (2):

$$G(s)=(s^2+2\zeta_2\omega_n s+\omega_n^2)/(s^2+2\zeta_1\omega_n s+\omega_n^2) \quad (2).$$

Here in case the aforementioned attenuation coefficients $\zeta_1$ and $\zeta_2$ are individually larger than 0 but smaller 1, the aforementioned Formula (1) or (2) has a pole and a zero point in the complex domain. By utilizing a resonance point or an antiresonance point to appear in the frequency characteristics at this time, therefore, a design can be made for setting the individual parameters of the phase compensating unit 123.

<4. Advantages>

According to the embodiment thus far described, the phase compensating unit 123 is disposed at the downstream stage of the basic assist current setting unit 122. Therefore, the dead zone and the characteristic break points, as contained in the basic assist current setting unit 122, exert no influence upon the design for setting the parameters of the phase compensating unit 123. Likewise, the change in the assist table exerts no influence upon the design for setting the parameters of the phase compensating unit 123. It is, therefore, to provide an electric power steering device which can attain the expected (or designed) control result and characteristics while using the phase compensator.

According to the aforementioned embodiment, moreover, the steering torque T from the torque sensor 3 can be applied not through the phase compensating unit to the basic assist current setting unit 122 and the compensation unit 121. Therefore, the expected control result can be obtained at the basic assist current setting unit 122 and the compensation unit 121 (especially the inertia compensating unit 1212).

<5. Modification>

In the embodiment thus far described, the phase compensation is done for the added current value It' by the phase compensating unit 123 so that the target current value It is outputted. However, the construction may be modified such that the phase compensation current value to be further added to the added current value It' may be outputted by the phase compensating unit.

Figure 5:
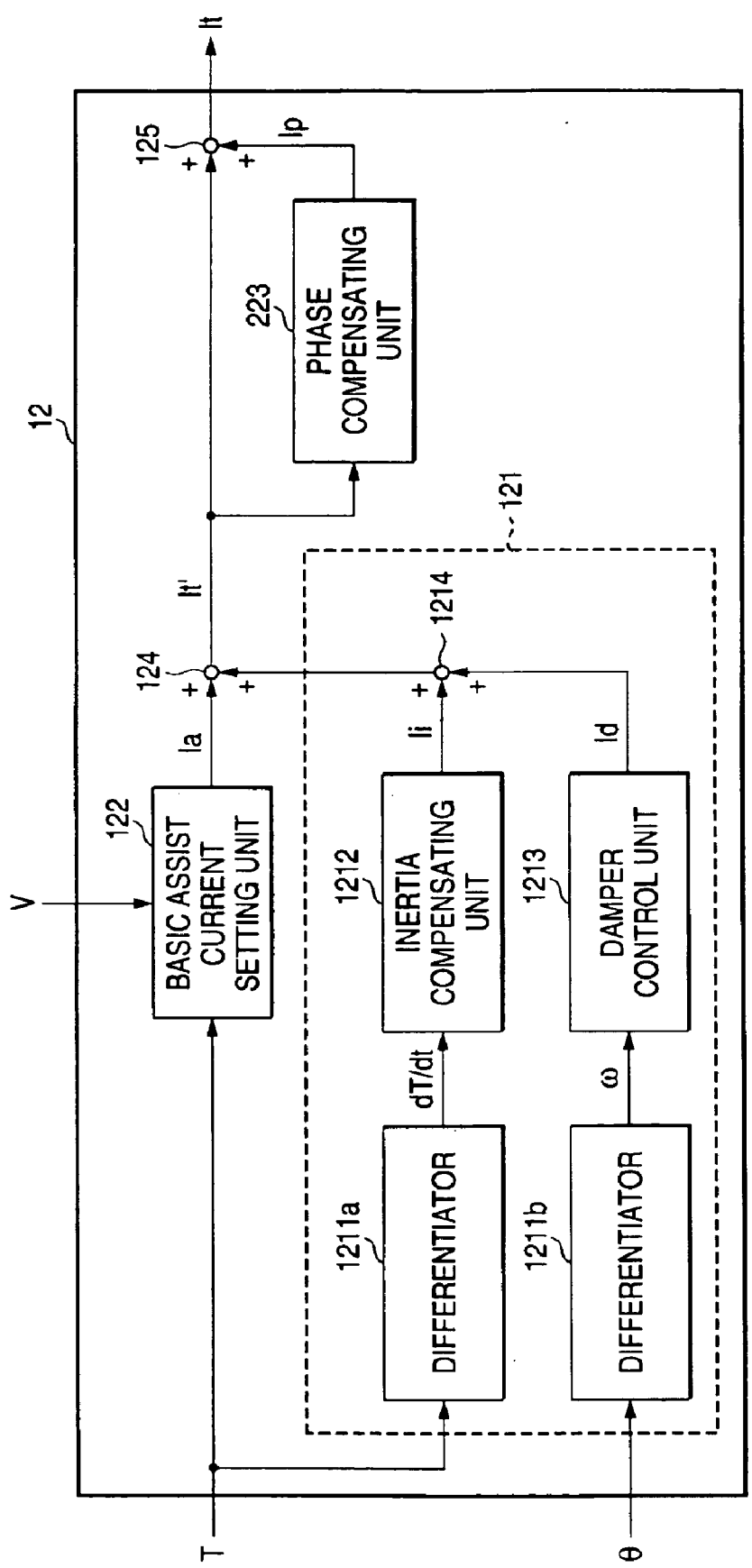
FIG. 5 is a block diagram showing a construction of a target current setting unit including a phase compensating unit in a modification of the embodiment.

FIG. 5 is a block diagram showing a construction of the target current setting unit 12 including a phase compensating unit for outputting the aforementioned phase compensating current value in the modification of the embodiment. As shown in FIG. 5, a phase compensating unit 223 outputs a phase compensating current value Ip by performing the phase compensation for the added current value It', and the adder 125 outputs the target current value It by further adding the phase compensating current value Ip to the added current value It'. The transmission function G(s) of that phase compensating unit 223 is expressed by the following Formula (3) for $\omega_1=\omega_2=\omega_n$:

$$G(s)=2(2\zeta_2+\zeta_1)\omega_n s/(s^2+2\zeta_1\omega_n s+\omega_n^2) \quad (3).$$

Here in case the attenuation coefficients $\zeta_1$ and $\zeta_2$ are individually larger than 0 but smaller than 1, Formula (3) has a pole and a zero point in the complex domain. By utilizing a resonance point or an antiresonance point to appear in the frequency characteristics at this time, therefore, a design can be made for setting the individual parameters of the phase compensating unit 223.

In the aforementioned embodiment, the differentiator 1211a gives the inertia compensating unit 1212 the differential value (dT/dt) of the steering torque T. However, the differentiator 1211a may accept the steering angular velocity ω from the differentiator 1211b and may give the inertia compensating unit 1212 the steering angular acceleration or the differential value of the steering angular velocity, so that the inertial compensating unit 1212 may output the inertia compensating current value It on the basis of that steering angular acceleration. Moreover, the steering angle sensor 2 may be replaced by a steering angular velocity sensor for detecting the steering angular velocity ω of the steering wheel, and the differentiator 1211b may be omitted so that the steering angular velocity ω from the steering angular velocity sensor may be inputted to the damper control unit 1213.

In the aforementioned embodiment, the compensation unit 121 includes the inertia compensating unit 1212 and the damper control unit 1213. In addition to these components, the compensation unit 121 may include various control units for performing compensations related to the mechanical elements of the vehicle including the electric power steering device and the well-known compensations (e.g., the dynamic compensations) related to the electric elements, such as a return control unit for performing a return control to improve the operability at the returning time of the steering wheel. Moreover, it is sufficient that the compensation unit 121 includes at least one of those control units for the compensations. In order to avoid either the influences of the dead zone and the characteristic break points of the assist table contained in the basic assist current setting unit 122 or the influences of the change in the assist table, moreover, it is sufficient that the phase compensating unit 123 is disposed at the downstream stage of the basic assist current setting unit 122. Therefore, the compensation unit 121 (and the adder 124) may be omitted.

In the embodiment thus far described, the microcomputer 10 executes the predetermined program thereby to realize the various components in the target current setting unit 12 in the software manner. However, these components may be partially or wholly realized in a hardware manner by a dedicated electronic circuit or the like. In the embodiment, moreover, the electric motor 6 is a general DC motor having a brush. However, the electric motor or the drive means in the invention should not be limited to the above-specified motor but may be a brushless motor, for example.

What is claimed is:

1. An electric power steering device for applying a steerage assisting power to the steering mechanism of a vehicle by driving an electric motor in accordance with a steering torque given by operation means for steering said vehicle, said power steering device comprising:

a torque sensor for detecting said steering torque;

a target value setting unit for setting as a target value the value of an electric current to be fed to said electric motor; and a control unit for feedback-controlling said electric motor on the basis of a current deviation between said current target value and the current to flow through said electric motor;

wherein said target value setting unit includes:

a basic assist current setting unit for accepting said steering torque from said torque sensor, to set a basic assist current value for determining a current to be fed to said electric motor, on the basis of the steering torque accepted; and a phase compensating unit for performing the phase compensation of said basic assist current value, to output the value of the current to be fed to said electric motor.

2. The electric power steering device according to claim 1, wherein said target value setting unit further includes:

a compensation unit for outputting a compensation current value to correct said basic assist current value; and an addition unit for outputting an added current value obtained by adding said basic assist current value and said compensation current value, and wherein said phase compensating unit performs the phase compensation of said added current value.

3. The electric power steering device according to claim 2, wherein said compensation unit includes an inertia compensating unit for accepting said steering torque from said torque sensor, to set an inertia compensating current value for the inertia compensation of said electric motor, on the basis of the differential value of the steering torque accepted, and wherein said compensation current value includes said inertia compensating current value.

4. The electric power steering device according to claim 3, wherein the compensation unit includes a steering torque differentiator for determining a differential value of the steering torque accepted, the steering torque differentiator accepts said steering torque directly from said torque sensor, and the inertia compensating unit accepts the differential value directly from the steering torque differentiator.

5. The electric power steering device according to claim 2, wherein said power steering device comprises a steering angle sensor for detecting a steering angle, the compensation unit includes a damper control unit for accepting said steering angle from said steering angle sensor, to output a damping control current value, on the basis of a differential value of the steering angle accepted, and wherein said compensation current value includes said damping control current value.

6. A control method for controlling an electric power steering device for applying a steerage assisting power to the steering mechanism of a vehicle by driving an electric motor in accordance with a steering torque given by operation means for steering said vehicle, said control method comprising:

detecting said steering torque;

setting as a target value the value of an electric current to be fed to said electric motor; and feedback-controlling said electric motor on the basis of a current deviation between said current target value and the current to flow through said electric motor, wherein said setting said value of said electric current includes:

accepting said steering torque from said torque sensor, to set a basic assist current value for determining a current to be fed to said electric motor, on the basis of the steering torque accepted; and performing the phase compensation of said basic assist current value, to output the value of the current to be fed to said electric motor.

7. The control method according to claim 6, wherein said setting said value of said electric current includes:

outputting a compensation current value to correct said basic assist current value; and outputting an added current value obtained by adding said basic assist current value and said compensation current value, and wherein, in said performing said phase compensation, the phase compensation of said added current value is performed.

8. The control method according to claim 7, wherein said performing said phase compensation includes an inertia compensating for accepting said steering torque from said torque sensor, to set an inertia compensating current value for the inertia compensation of said electric motor, on the basis of the differential value of the steering torque accepted, and wherein said compensation current value includes said inertia compensating current value.

9. The control method according to claim 8, wherein the inertia compensating includes a steering torque differentiating for determining a differential value of the steering torque accepted, the steering torque differentiating accepts said steering torque directly from said torque sensor, and the inertia compensating accepts the differential value directly from the steering torque differentiating.

10. The control method according to claim 7, further comprising:

detecting a steering angle, wherein outputting a current compensation value includes accepting said steering angle from said detecting a steering angle, to output a damping control current value, on the basis of a differential value of the steering angle accepted, and wherein said compensation current value includes said damping control current value.

11. The control method according to claim 7, wherein the setting as a target value comprises setting as the value of the electric current to be fed to the electric motor the sum of said added current value and the value of the phase compensation of said added current value.

12. An electric power steering device for applying a steerage assisting power to the steering mechanism of a vehicle by driving an electric motor in accordance with a steering torque given by operation means for steering said vehicle, said power steering device comprising:

a target value setting unit for setting as a target value the value of an electric current to be fed to said electric motor, wherein said target value setting unit includes:

a basic assist current setting unit for accepting the steering torque, to set a basic assist current value for determining a current to be fed to said electric motor, on the basis of the steering torque accepted; and a phase compensating unit for performing the phase compensation of said basic assist current value, to output the value of the current to be fed to said electric motor, whereby said target value setting unit is usable with a control unit for feedback-controlling said electric motor on the basis of a current deviation between said current target value and the current to flow through said electric motor.

13. The electric power steering device according to claim 12, wherein said target value setting unit includes:

a compensation unit for outputting a compensation current value to correct said basic assist current value; and an addition unit for outputting an added current value obtained by adding said basic assist current value and said compensation current value, and wherein said phase compensating unit performs the phase compensation of said added current value.

14. The electric power steering device according to claim 13, wherein said compensation unit includes an inertia compensating unit for accepting said steering torque, to set an inertia compensating current value for the inertia compensation of said electric motor, on the basis of the differential value of the steering torque accepted, and wherein said compensation current value includes said inertia compensating current value.

15. The electric power steering device according to claim 14, wherein the compensation unit includes a steering torque differentiator for determining a differential value of the steering torque accepted, the steering torque differentiator accepts said steering torque in a condition that is not phase compensated, and the inertia compensating unit accepts the differential value directly from the steering torque differentiator.

16. The electric power steering device according to claim 13, wherein said power steering device comprises a steering angle sensor for detecting a steering angle, the compensation unit includes a damper control unit for accepting said steering angle from said steering angle sensor, to output a damping control current value, on the basis of a differential value of the steering angle accepted, and wherein said compensation current value includes said damping control current value.

17. The electric power steering device according to claim 12, further comprising a control unit for feedback-controlling said electric motor on the basis of a current deviation between said current target value and the current to flow through said electric motor.

18. The electric power steering device according to claim 17, wherein said target value setting unit includes:

a compensation unit for outputting a compensation current value to correct said basic assist current value; and an addition unit for outputting an added current value obtained by adding said basic assist current value and said compensation current value, and wherein said phase compensating unit performs the phase compensation of said added current value.

19. The electric power steering device according to claim 18, wherein said compensation unit includes an inertia compensating unit for accepting said steering torque, to set an inertia compensating current value for the inertia compensation of said electric motor, on the basis of the differential value of the steering torque accepted, and wherein said compensation current value includes said inertia compensating current value.

20. The electric power steering device according to claim 19, wherein the compensation unit includes a steering torque differentiator for determining a differential value of the steering torque accepted, the steering torque differentiator accepts said steering torque in a condition that is not phase compensated, and the inertia compensating unit accepts the differential value directly from the steering torque differentiator.

* * * * *